Jan. 5, 1971  J. W. DOBRAUZ  3,552,224
LATERALLY SHIFTABLE GEARBOX ASSEMBLY WITH PRELOAD ADJUSTMENT
Filed June 27, 1969  3 Sheets-Sheet 1

INVENTOR
John W. Dobrauz.

BY *William J. Newman*

ATTORNEY

United States Patent Office 3,552,224
Patented Jan. 5, 1971

3,552,224
LATERALLY SHIFTABLE GEARBOX ASSEMBLY WITH PRELOAD ADJUSTMENT
John W. Dobrauz, Chicago, Ill., assignor to Stewart-Warner Corporation, Chicago, Ill., a corporation of Virginia
Filed June 27, 1969, Ser. No. 837,188
Int. Cl. F16h *19/04, 55/18, 57/00*
U.S. Cl. 74—405                                                13 Claims

ABSTRACT OF THE DISCLOSURE

A gearbox assembly including a motor driven pinion gear is fixed to a pivot shaft which in turn is rotatably mounted on a stationary bracket. A plunger lever is coupled to the pivot shaft by a split collar allowing angular adjustment of the plunger lever on the pivot shaft. A coil spring biasing the plunger lever and the pinion gear into mesh with the driven rack gear is adjusted to relieve or increase the spring-biasing force.

BACKGROUND OF THE INVENTION

Field of the invention

This invention relates to pivotably supported gearbox assemblies and more particularly, to a simplified arrangement for moving the driving pinion into mesh with a driven rack, prior to independently adjusting the spring preload force acting on the driving pinion.

Description of the prior art

It is conventional in machinery requiring the precise movement of a driven member by a driving member to employ a unitary, motorized gearbox assembly wherein a small electric motor carried by the gearbox assembly rotates a small pinion gear through speed reduction means at a precise driving speed in a reversible maner and within closely defined angular limits. It is further conventional to support the unitary gearbox and motor by pivoting the same on a fixed bracket such that the pinion may be removed selectively into and out of mesh with a driving member. The driven member may be either another rotary gear or an elongated rack where rotary motion is transformed into linear movement.

The unitary motor and gearbox assembly may sometimes be pivoted from an inoperative to an operative or in-mesh position and locked in the operative position. It is further conventional to use spring means for biasing the pivotable driving unit into mesh with the driven unit. The spring bias or preload which is applied to the driven unit, thus has a tendency to prevent backlash between the gear members. The prior art devices ordinarily used torsion type coil springs for preloading with no provisions for varying the preload force in accordance with the needs of the machine to which it was applied. Furthermore, the prior art devices had no means for releasing the preload force during mounting operations and heavy torque levers and pin lock arrangements were required when the motor drive were installed on machines. The torsion spring type devices were quite bulky in size in view of the inefficiency of such coil springs in torsion which also made the mountings rather costly.

SUMMARY OF THE INVENTION

This invention is directed to an improved spring bias or preload for obtaining the desired preload setting of the driving pinion gear on the gearbox assembly to a mating driven member on a machine, either another rotary gear or an elongated rack.

Also, an improvement is directed to the pivotable mounting arrangement whereby preload is not encountered during the assembly of the gearbox drive assembly to the machine. This facilitates the assembly.

A stationary mounting plate rotatably carries a pivot shaft whose axis is generally parallel to the gearbox drive shaft carrying the pinion drive gear. The gearbox itself is fixedly coupled to the pivot shaft. A lever is carried by the pivot shaft and means are provided for adjusting the angular position of the lever with respect to the pivot shaft. A coil spring is mounted between the free end of the lever and a bracket carried by the sationary mounting plate and means are associated with these members for adjusting the bias of the spring independently of the angular position of the lever with respect to the pivot shaft.

In particular, the lever terminates at one end in a split collar and carries a series or set screws for enlarging or decreasing the internal diameter of the collar to either relieve or increase the frictional gripping force between the collar and the pivot shaft. The opposite end of the lever carries a recess which receives one end of a coil spring having the other end abutting a plunger which is adjustably coupled to the fixed bracket. By moving the plunger axially, the spring force acting on the lever may be increased or totally removed.

This permits simplified adjustment with identical preloads regardless of the number of times the driving gear is engaged with or disengaged from the driven gear. Adjustment involves merely the loosening of one set of set screws on the split collar and tightening of other set screws to spread the collar segments, loosening of the set screw freeing the plunger from the coil spring carried within the lever recess, bolting of the gearbox stationary support to the machine, rotation of the gearbox until the pinion gear engages the driven gear, rotation of the now free lever until the plunger touches the stop bracket, release of the collar spreading screws, tightening of the frictional gripping screws of the collar and tightening of the plunger set screw the number of turns for the preload desired. Locking of the plunger set screw finishes the adjustment sequence.

DESCRIPTION OF THE PREFERRED EMBODIMENT

Figure 1:
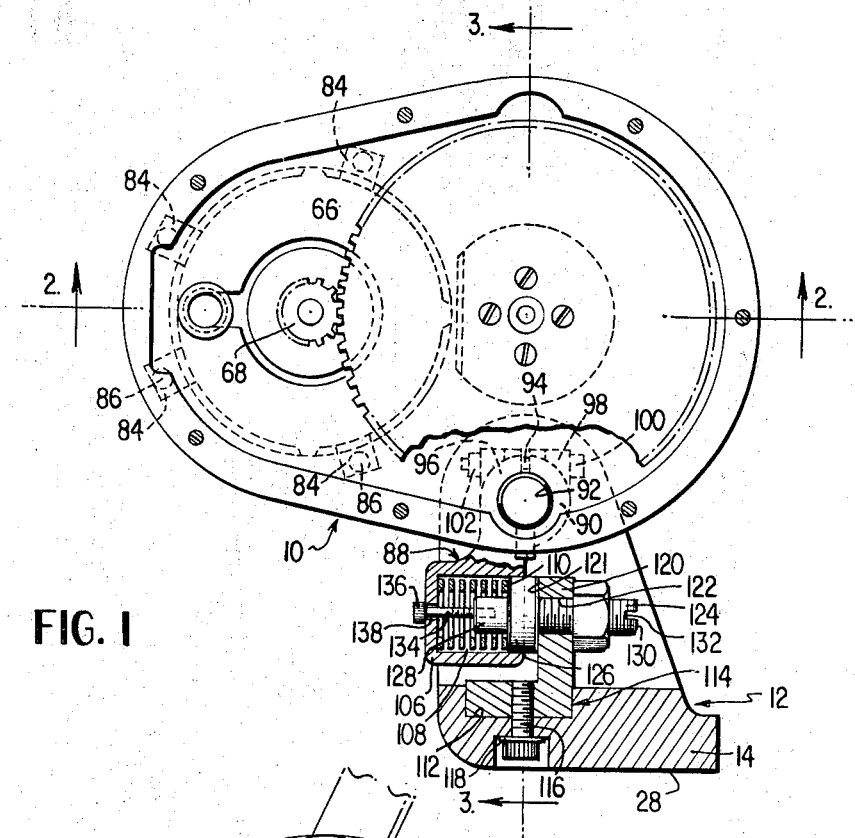
FIG. 1 is a top plan view, partially in section of the mounting arrangement for the motor driven gearbox of the present invention.

Referring to the drawings, a combined motor and gearbox assembly 10 is shown as being pivotably supported with respect to a relatively stationary motor mount 12. Motor mount 12 may constitute, for example, a cast metal member having a flattened base 14 which includes a number of holes 16 for receiving mounting bolts (not shown) allowing the motor mount to be attached to the machinery (not shown). This machinery carries the driven gear member, preferably a gear rack 18 shown in phantom line fashion in FIG. 4. A pair or right angle flanges 20 extend outwardly from the base 14 and are apertured at 22 to receive respective ball bearing assemblies 24, the ball bearing assemblies acting to rotatably support a pivot shaft 26 which extends generally parallel to the flat mounting face 28 of the stationary motor mount 12.

The pivot shaft 26 has rigidly coupled thereto, gearbox casing 28; casing 28 having right angle flange portions 30 thereon which are apertured at 32 and 32'. The upper arm 30 carries a bore 32 of a diameter slightly larger than that of the pivot shaft 26. A stud pin 34 extends through the pivot shaft 26 and is received within arm 30 to fixedly lock the pivot shaft to the gearbox casing 28. Likewise, the lower arm 30 is bored at 32' and carries a thin cylindrical bushing 36 and a tapped and threaded hole 38 which receives a set screw 40 for locking the lower end of pivot shaft 26 to lower arm 30. Further, in order to properly locate the shaft axially of the motor and gearbox assembly 10, the lower end of the shaft 26 is threaded at 42 and carries a lock nut 44 and an appropriate lock washer 46. As such, while the gearbox and motor assembly 10 may pivot with respect to the motor mount 12, due to the presence of ball bearings 24, there is no relative movement between the pivot shaft 26 and assembly 10.

Figure 4:
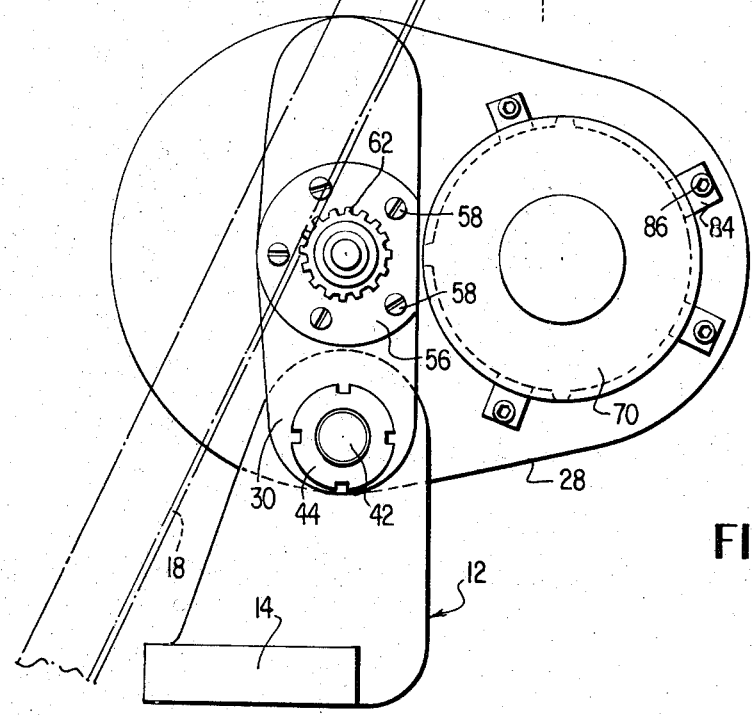
FIG. 4 is a bottom plan view of the gearbox mounting arrangement of FIG. 1.
Figure 2:
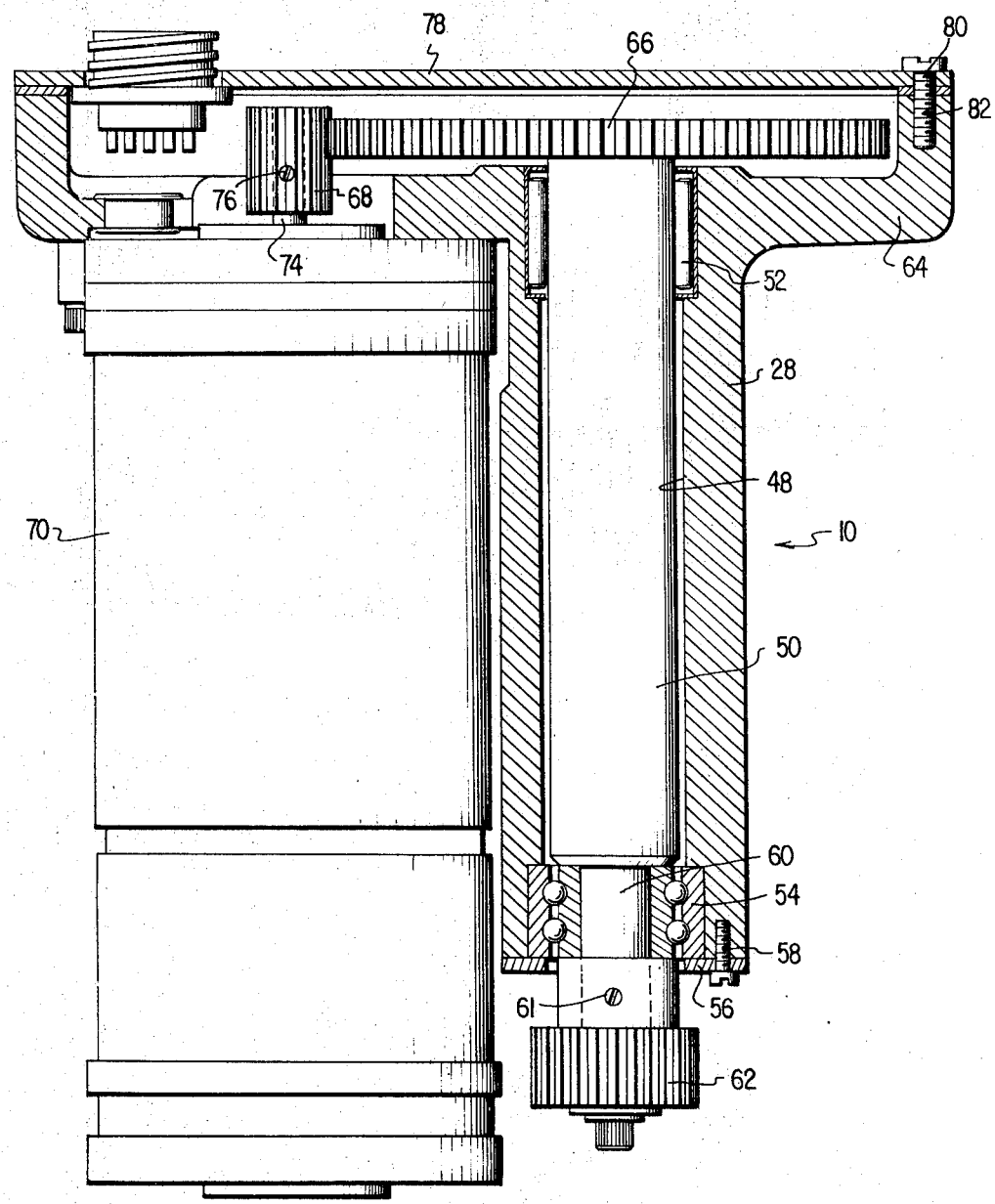
FIG. 2 is a sectional view of the gearbox taken about lines 2—2 of FIG. 1.

The gearbox casing 28 is further provided with an enlarged bore 48 which carries the motor drive shaft 50, supported at the upper end by needle bearing 52 and at the lower end by a paired ball bearing assembly 54. A gearbox bearing plate 56 in annular form maintains the ball bearing 54 in position, the gearbox bearing plate 56 being coupled to the lower end of casing 28 by a plurality of cap screws 58. The drive shaft 50 has a reduced diameter portion 60 at the lower end and by conventional pin means 61, has rigidly coupled thereto, a drive gear in the form of pinion 62. The pinion 62, as seen in FIG. 4, is spring-biased in mesh with the driven gear member in the form of rack 18. The gearbox casing terminates at the upper end in an enlarged diameter portion 64 which receives a relatively large diameter drive shaft gear 66 which is in direct mesh with the motor pinion 68. In his respect, the drive motor 70, FIG. 2, is coupled at its upper end by means (not shown) to the gearbox casing 28. The drive motor output shaft 74 carries the motor pinion 68 by means of a tapered pinion mounting pin 76 which extends through the pinion gear 68 and the apertured motor output shaft 74.

A gearbox cover 78 overlies the enlarged diameter portion of the gearbox casing, the cover being securely fixed to the peripheral edge of the enlarged casing section 64 by a series of cap screws 80 which extend therethrough and are received in tapped and threaded holes 82 carried by the gearbox casing section. It is noted in FIG. 1, that the drive motor is further coupled to the oval-shaped enlarged portion of the gearbox casing by a series of motor clamps 84, the clamps in turn being coupled to the gearbox casing by cap screws 86.

Figure 3:
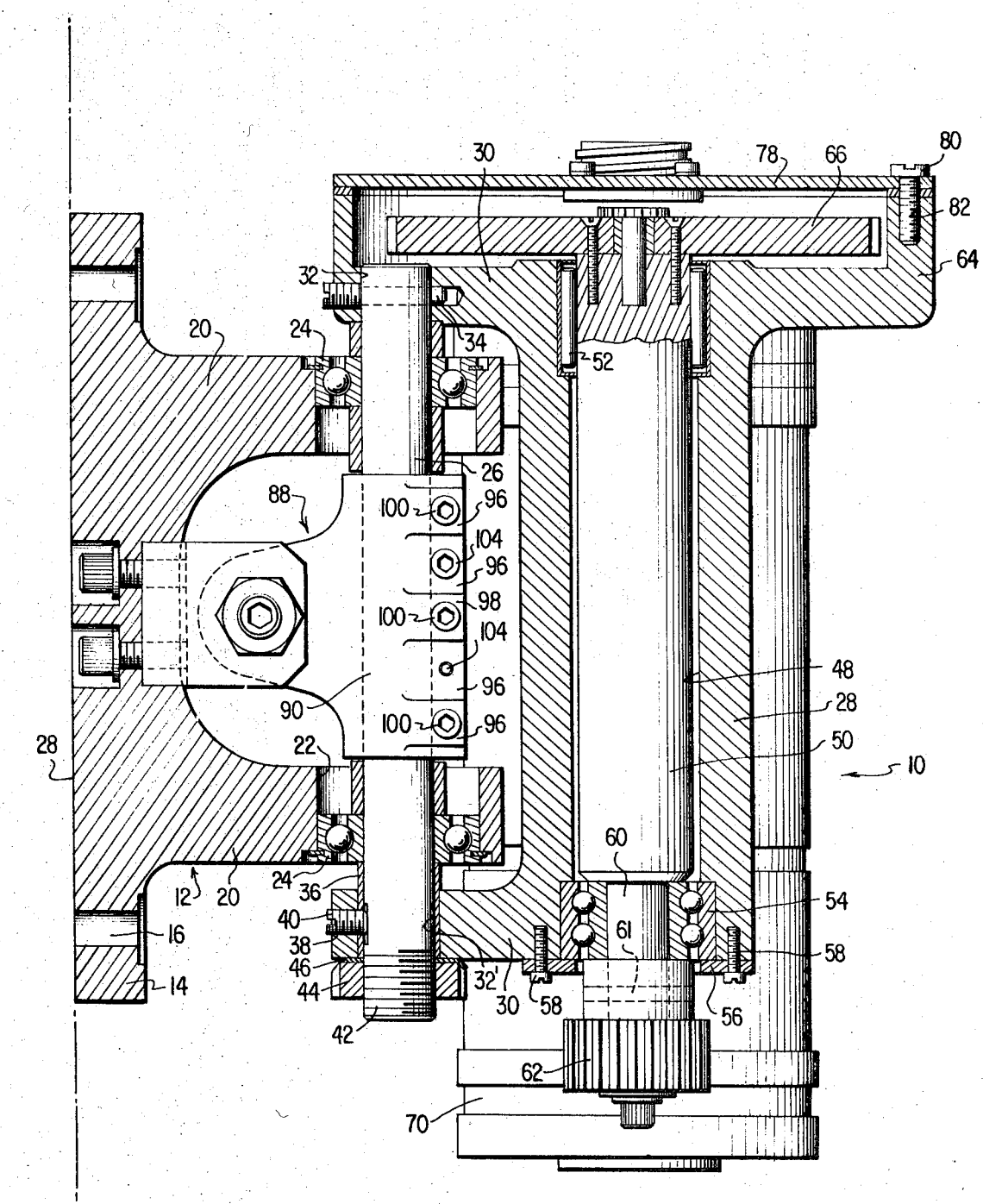
FIG. 3 is a sectional view of the gearbox mounting arrangement of FIG. 1 taken about lines 3—3.

The present invention is directed to the simplified arrangement for preloading the driving pinion 62 into mesh with the driven rack 18 with the preload being adjustably set subsequent to actual pivoting of the pinion into mesh with the rack member. This is facilitated primarily by means of a plunger lever identified generally at 88 which constitutes a formed or cast metal member having its inner end in the form of a longitudinally split and slotted collar 90 forming a circular opening or bore 92 which receives the pivot shaft 26. Opposed, resilient, semi-solid fingers or portions 96 in themselves, include flange portions 98. The flange portions are bored and some carry machine screws 100 which extend across the slot 94, the ends of the screws 100 receiving suitable nut plates 102. However, in addition to machine screws 100, there are machine screws 104 which extend through certain fingers, FIG. 1, but the opposed finger is not bored. The screws 104 are short so that their inner end abuts the opposite finger 96 on the other side of slot 94. Thus, by rotating machine screw 104 instead of increasing the clamping pressure or frictional restraint between the split collar and the pivot shaft it actually opens the resilient finger portions 96 to release frictional restraint and allow the plunger lever to be pivoted, that is, angularly rotated with respect to the relatively fixed pivot shaft. Thus, in essence, the pairs of machine screws 100 on either side of machine screw 104, FIG. 3, tighten the split collar, while the function of machine screws 104 is to release the same with respect to the pivot shaft 26.

The opposite end of the plunger lever 88 terminates in an enlarged cylindrical portion 106, FIG. 1, which carries a cylindrical recess 108 formed therein to receive and carry a compression coil or die spring 110 or any other type of compressible member or substance.

The rear surface 110 of the motor mount base 14 is also recessed at 112 to receive an L-shaped stop bracket 114 whose base is coupled to the motor mount base by a cap screw 116 held in position by a conventional lock washer 118. The right angle portion 120 of the stop bracket is bored and threaded at 122 to receive set screw 124, the inner end of which abuts a circular plunger 126 of a diameter on the order of that of the plunger lever recess 108. Protruding from the forward face of plunger 126 is a reduced diameter portion 128 which itself is tapped and threaded to receive the threaded end of screw 134. The serrated end 136 of this screw abuts the wall surrounding aperture 138 in the face of the cylindrical section 106 of the plunger lever. Set screw 124 carries a plain jam hex nut 130 whereby, the position of the set screw may be adjusted with respect to the stop bracket 114 by a screwdriver inserted in end slot 132.

The operation of the spring-biased preloaded motor driven gearbox assembly and the preload adjustment of the same will now be described. Prior to mounting of the motor mount 12 onto the piece of machinery (not shown), the three machine screws 100 are loosened so as to relieve the frictional grip between the split collar 90 and the pivot shaft 26. This, in itself, may not provide the free movement necessary between the plunger lever 88 and the pivot shaft 26. Thus, it may be necessary to tighten the intermediate screws 104, in between machine screws 100, causing the enlargement of the slot 94 between the collar segments 96. The lever 88 now moves freely with respect to its supporting pivot shaft 26. Set screw 124 is adjusted to the position shown in FIG. 1, until its oval head 125 is beneath the left-hand stop surface 121 of the stop bracket portion 120. At this point, the die spring 110 is fully relaxed and the plunger 126 is in its extreme right-hand position with respect to the recess 108 receiving the same. It is prevented from falling out by screw 134.

The gearbox 10 is then bolted to the machine (not shown) by clamping the base 14 to the machine. Since the gearbox casing 28 is freely revolvable through the pivot shaft 26 by means of the spaced ball bearings 24, the gearbox is rotated about the axis of the pivot shaft 26 until the driving pinion gear 62 meshes with the driven rack 18. While the pinion gear 62 is in engagement with the rack 18, the plunger lever is now rotated until the plunger 126 just touches the face 121 of the stop bracket as shown in FIG. 1. Next, the intermediate machine screws 104 are untorqued or removed causing the clamping fingers or sections 96 of the split collar 90 to compress and frictionally grip the peripheral surface of pivot shaft 26. The three machine screws 100 are tightened down causing further compression of the split collar sections 96 fixing the angular position of the plunger lever with respect to the pivot shaft 26. The final step lies in tightening the set screw 124 to the preload design and locking the setting by rotation of the hex nut until it fully abuts the surface of the stop bracket portion 120. The rotation of the set screw causes its oval head 125 to force the plunger 126 inwardly against the die spring 110 compressing the same and setting up the desired preload of the pinion gear in mesh with the driven rack. If for any reason it is desired to readjust the assembly or replace the components, etc., a reverse procedure is followed during removal of the unit and subsequently reassembly and adjustment follows the procedure described above.

It is noted that the mechanism preloads the pinion gear into the rack under an arrangement that is both simple, compound, and low in cost, and which can be made into a right- or left-hand unit. Further, it is easy to install and adjust with a preciseness that insures that the same preload forces will be placed on the pinion regardless of the number of installations and removals. Again, while the pivotably mounted motor and gearbox assembly with preload adjustment has particular application to the precise movement of a rack forming a part of a high speed tracer apparatus, without backlash and under motor reversal operations, and with motor reversal and rack movement occurring between exactly defined limits, the apparatus of the present invention has broad application to the precise driving of rotary and/or elliptical gears under preload and without backlash.

What is claimed is:

1. In combination, a machine including a driven gear, a motor mount, a gearbox assembly including a driving gear carried by an output drive shaft, a pivot shaft pivotably carried by said motor mount, means for fixedly coupling said gearbox assembly to said pivot shaft for rotation of said assembly about an axis generally parallel to that of said output shaft, a lever carried by said shaft, means for adjusting the angular position of said lever with respect to said pivot shaft, spring means carried between said lever and said stationary motor mount and means for adjusting the bias force of said spring independent of the angular position of the lever on said pivot shaft.

2. The gearbox assembly as claimed in claim 1 wherein said lever includes a split collar having axially separated portions partially surrounding and in contact with said pivot shaft, and adjustment means for independently causing said portions to move toward each other to frictionally grip said shaft or to move away from each other to release the same.

3. The gearbox assembly as claimed in claim 2 wherein said adjustment means comprises a plurality of adjustment screws, certain ones of said screws being threadably received by said opposed portions of said collar while at least one other screw is threadably received by only one of said portions and has its end in abutting contact with said other portion on the side opposite thereof.

4. The gearbox assembly as claimed in claim 3 wherein the other end of said lever includes a plunger recess, a plunger carried by said recess, a coil spring carried within said recess and in contact with said plunger, and a stop bracket carried by said motor mount for limiting movement of said plunger within said recess in a direction away from said spring.

5. The gearbox assembly as claimed in claim 4 wherein said bracket member carries a set screw whose axis is in a line with said recess, said spring and said plunger, said set screw having a face adapted to contact said plunger and to cause compression of said coil spring to spring bias said pinion drive gear into mesh with said driven gear.

6. The gearbox assembly as claimed in claim 5 wherein said plunger further includes a reduced diameter portion carried internally of said recess and coaxially of said spring, said reduced diameter portion being tapped and threaded, an aperture formed within said recess carrying portion of said lever and coaxial with said recess, a headed screw passing through said recess and threadably engaging said reduced diameter portion of said plunger for maintaining said plunger in position during shipment and prior to attachment of the assembly to the machinery to be driven thereby.

7. In combination, a machine including a driven gear, a motor mount including a flattened base portion and a pair of right angle, spaced bracket arms, a pair of spaced, axially aligned ball bearings within respective bracket arms, a pivot shaft carried by said ball bearings and freely rotatable with respect to said motor mount, a gearbox assembly including an enlarged bore, bearing means within said bore and a driven shaft which extends parallel to a drive shaft carried by said bearing means, said gearbox casing including a pair of arms and means fixedly coupling said arms to the ends of said pivot shaft outside of said motor mount bracket arms, a drive motor fixedly coupled to said gearbox assembly and means operatively coupling said driving motor to said driven shaft, a plunger lever, one end of said plunger lever terminating in a split collar having opposed fingers adapted to frictionally grip said pivot shaft, first set screws for increasing the frictional force exerted by said fingers on said pivot shaft, second set screws for positively opening said fingers to remove said frictional force, the opposite end of said lever terminating in an enlarged diameter portion carrying a cylindrical recess, a reciprocating plunger carried within said recess and biased outwardly by a coil spring, an L-shaped stop bracket carried by said motor and having a face adapted to contact the outer surface of said plunger, and set screw means carried by said L-shaped bracket and having an end engageable with a portion of said plunger whereby, subsequent to engagement of the drive pinion with a driven gear member, rotation of said set screw means creates a spring force preload between the gear teeth of the driving gear member and the driven gear member.

8. The assembly as claimed in claim 7 wherein said cylindrical plunger includes a reduced diameter portion extending interiorly within said recess in a coaxial manner and within said coil spring, and said lever initially carries a screw member threadably received by said reduced diameter portion for maintaining said plunger partially within said recess during shipment of said assembly.

9. For use on a machine having a movable support and a relatively stationary support with a driven gear on one of said supports, motor drive mounting means comprising a motor mount assembly fixedly attachable to the other of said supports, a motor and gearbox assembly including a driving gear carried by an output drive shaft, a pivot shaft, first means on one of said assemblies for fixedly attaching said pivot shaft thereto, second means on the other of said assemblies for rotatably attaching said pivot shaft thereto, said attaching means adapted and arranged to enable rotation of said gearbox assembly about the axis of said pivot shaft for engagement of said driver gear with said driven gear, a lever carried by said pivot shaft, means for adjusting the angular position of said lever with respect to said pivot shaft, and means carried between said lever and the assembly having said pivot shaft rotatably attaching means for providing a bias force to maintain said driven and driving gear in engagement.

10. The mounting means of claim 9 further comprising: means for adjusting the bias force of said bias force providing means.

11. The mounting means of claim 9 wherein said means for adjusting the angular position of said lever with respect to said pivot shaft comprises a split collar carried by said lever and having portions on opposite sides, partially surrounding and in contact with said pivot shaft, an adjustment means carried by said split collar for independently causing portions of said split collar to move toward each other to frictionally grip shaft or to move away from each other to release the same.

12. The mounting means of claim 11 wherein said adjustment means comprises a plurality of adjustment screws, certain ones of said screws being threadably received by opposed portions of said screws while at least one other screw is threadably received by only one of said portions and has its inner end in abutting contact with the opposed portions of said collar on the side opposite thereof.

13. The mounting means of claim 10 wherein said means for adjusting the bias force of said bias force providing means includes a plunger recess carried at one end of said lever, a plunger within said recess, a coil spring within said recess and in contact with said plunger, a stop bracket for limiting movement of said plunger within said recess in a direction away from said spring and a set screw whose axis is in line with said recess, said spring and said plunger, with said set screw having a face adapted to contact said plunger and to cause compression of said coil spring to spring bias said drive gear to mesh with said driven gear.

References Cited
UNITED STATES PATENTS 2,804,781  9/1957  Zeitz _____ 74—405X

FOREIGN PATENTS 556,314  9/1943  Great Britain _____ 74—409

LEONARD H. GERIN, Primary Examiner

U.S. Cl. X.R.

74—31, 409